UNITED STATES PATENT OFFICE.

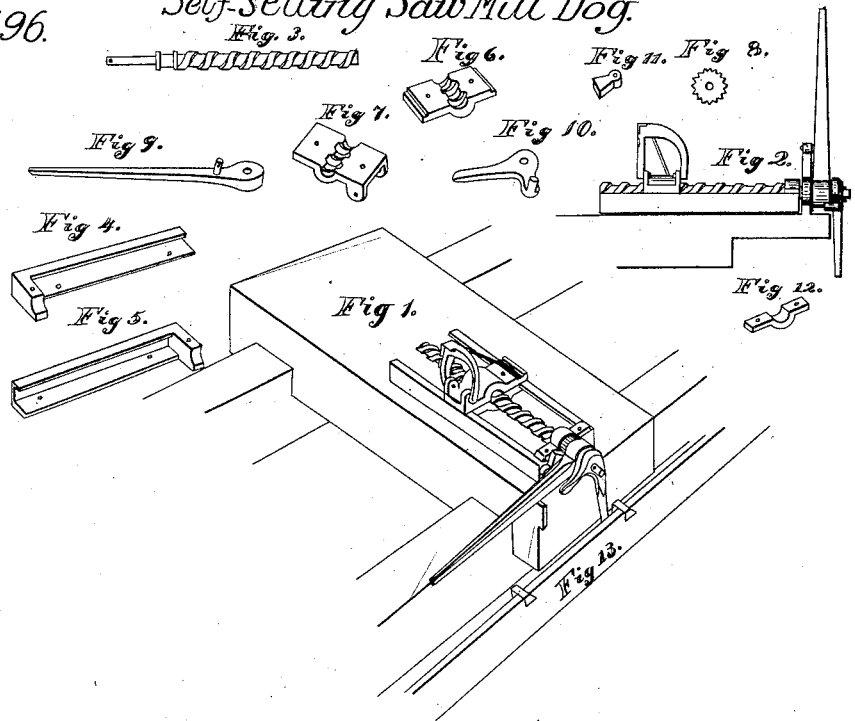
L. Yale
Self-setting Saw Mill Dog.
No. 2,196.
Patented July 29, 1841.
Fig 1. Perspective View of the whole Machine.
Fig 2. Elevation of the same with the hand lever raised.
Fig 3. Screw.
Fig 4. Left Way.
Fig 5. Right Way.
Fig 6. Lower part of Nut.
Fig 7. Upper part of Nut.
Fig 8. Notched Wheel.
Fig 9. Hand Lever.
Fig 10. Self Setting Lever.
Fig 11. Iron Hand.
Fig 12. Cap of Box.
Fig 13. Timber on the floor with iron pins.

LINUS YALE, OF NEWPORT, NEW YORK.

IMPROVEMENT IN SAW-MILL DOGS.

Specification forming part of Letters Patent No. 2,196, dated July 29, 1841.

*To all whom it may concern:*

Be it known that I, LINUS YALE, of the town of Newport, in the county of Herkimer and State of New York, have invented a new and useful Improvement in Self-Setting Saw-Mill Dogs; and I do hereby declare that the following is a full and exact description.

Upon that portion of the carriage of the saw-mill called the "head" and "tail" block I bolt two cast-iron ways on the top, which lie parallel with the block, about eight inches apart, and reaching from one end to the center of the block, made in the following manner: The base is three inches wide and five-eighths of an inch thick. The upright portion is two inches high and the same thickness, with a flange projecting from the top over the base about a half of one inch square, to admit a nut with grooves in the ends to pass freely back and forth between the ways. This nut is made in two parts—upper and lower—and bolted together, with a hole in the center two and a half inches in diameter, containing a thread inside suitable to receive a screw, hereinafter described. This nut is six inches wide and nine inches long, the upper part lying on the top of the ways, and the lower part reaching at each end under the projections or flanges at the top of the ways, and forming, when bolted together, the grooves in the ends of the nut, as above described.

I make a screw of cast-iron, two and a half inches in diameter and two feet and six inches long. The thread on this screw is one inch wide and the space between the threads is one inch wide, causing it to drive the nut two inches to each revolution of the screw, which lies between the two ways and parallel with them, passing through the nut above described. The body of this screw projects over the end of the block about six inches, and is fitted to receive a wheel, levers, &c., having a journal lying in a box which is placed crosswise between the ends of the ways and bolted fast to the block, allowing the screw to revolve and drive the nut back and forth between the ways.

On the screw, outside of and near the box, is a wheel made fast to the body of the screw, six inches in diameter and one inch thick, having sixteen notches in its edge at equal distances apart. Outside of this wheel is a hand-lever, two feet and six inches long and one inch thick, having a hole through one end large enough to slip onto the body of the screw, which is the fulcrum of the lever, lying at right angles with the screw and resting on a portion of the block in nearly a horizontal position. On the inside of this hand-lever, about three inches from the edge of the wheel, is a horn or stud, of cast-iron, about one and a half inch long, on which hangs a small iron hand five inches long and one inch thick, which plays loose on the stud, and is secured by a small iron pin passing through the stud outside of the hand. The end of this iron hand is fitted to the notches in the wheel, and may be reversed at pleasure, by which the screw is made to revolve either way by moving the hand-lever. Outside of this hand-lever, on the body of the screw, hangs loose a self-setting lever, about twelve inches long and one inch thick, with an arm extending from the top and parallel with the hand-lever, about six inches in length, having its end turned under the hand-lever.

On the floor of the mill is pinned or bolted a piece of timber twelve feet long, two or three inches thick, and five or six inches high, lying parallel with the carriage, so that the self-setting lever may pass near it as the carriage moves back and forth. Through this timber are holes one inch in diameter and eighteen inches apart to receive iron pins four inches long, which the self-setting lever strikes when the carriage is passing back, by which means the hand-lever is raised and the screw turned one or more notches. After passing one pin the levers fall back into their original position, the iron hand catches in another notch on the wheel, and is prepared to turn the screw in the same way until the log is moved the distance required, more or less of those pins being used to set different kinds of boards.

On each corner of the top of the nut on the end toward the log is an ear two inches wide and one inch thick, rising from the base about two inches. Through each of those ears is a hole in the center, about one inch in diameter. A wrought-iron half-bail dog is so constructed that the lower ends are turned into these holes, which attaches it to the nut, allowing it to swing back and forth. This dog is eight or nine inches high, and on the front side, at the top, are teeth projecting forward to hold the log. On the back side of the dog, at the top, is an eye, in which hangs a piece of wrought-iron, about nine inches long and three-fourths of an inch square.

On the top of the nut, across the back end, opposite the dog, are grooves cut crosswise in the iron, into which the lower end of this piece of wrought-iron is driven sidewise to hold the dog fast in the log.

The above is a full and exact description of the machine on the block toward which the saw cuts, commonly called the "tail-block." That part which is attached to the head-block is the same, with the exception of the self-setting lever, which is not used on the head-block, the hand-lever being moved by hand one notch on the wheel for every eighth of an inch the log is to move to set the board the thickness required. On one of those screws the thread runs one way and on the other the other way, called "right" and "left." One is applied to the head and the other to the tail block, that the hand-lever may bear down to the head-block (when raised) to set the board, and the one on the tail-block may rise when it sets the board, that after being raised by the self-setting lever passing over the pin it may fall back into its original position, enabling the iron hand to catch in another notch in the wheel before it (the self-setting lever) strikes another pin in the timber on the floor.

The screws are made in the following manner: The patterns are in two parts, divided in the center lengthwise. One half is laid on the molding-board (or bottom of the flask) the flat side down, the sand packed in the nowel, (or under part of the flask,) which is then turned over, the board taken off, and the other part of the pattern laid on, which is kept in its proper place by slight pins passing through one-half and a little distance into the other. The cope or upper part of the flask is then set on and filled with sand and taken off, (as in the ordinary way of molding to cast,) leaving one-half of the pattern in the upper and one-half in the lower part of the flask. Each half of the pattern is then carefully withdrawn from the sand and the flask closed, making, when the iron is poured in, a perfect screw without the expense of cutting the thread, as in the common way of making screws.

In addition to the former description of the ways, I cast one-half of the lower part of the box, in which the journal of the screw lies, on one end of each way, which, when the ways are placed on the block meet in the center, forming the lower half of the box. The upper part or cap of the box is laid across the journal and bolted through the ways each side of the screw.

What I claim as my invention, and desire to secure by Letters Patent, is not the principle of a screw, hand-lever, notched wheel, or iron hand, as others of a different form have been used; but

I do claim—

1. The nut in combination with the wrought-iron dog, as herein described.

2. The self-setting lever in combination with the hand-lever, notched wheel, and screw, for the purpose and in the manner specified.

In testimony that the above is a full and exact description of the construction and use of the above-described machine as invented by me I have hereunto set my hand this 13th day of March, 1841.

LINUS YALE.

Witnesses:
STUART PERRY,
LINUS YALE, Jr.